US009299084B2

(12) United States Patent
Argue et al.

(10) Patent No.: US 9,299,084 B2
(45) Date of Patent: Mar. 29, 2016

(54) DETECTING CUSTOMER DISSATISFACTION USING BIOMETRIC DATA

(71) Applicant: WAL-MART STORES, INC., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 315 days.

(21) Appl. No.: 13/687,988

(22) Filed: Nov. 28, 2012

(65) Prior Publication Data

US 2014/0147018 A1    May 29, 2014

(51) Int. Cl.
*G06Q 30/02* (2012.01)

(52) U.S. Cl.
CPC ................. *G06Q 30/0201* (2013.01)

(58) Field of Classification Search
None
See application file for complete search history.

(56) References Cited

U.S. PATENT DOCUMENTS

| | | | |
|---|---|---|---|
| 3,195,533 A | 7/1965 | Fischer | |
| 6,006,188 A | 12/1999 | Bogdashevsky | |
| 6,151,571 A | 11/2000 | Pertrushin | |
| 6,190,314 B1 | 2/2001 | Ark | |
| 6,363,346 B1 | 3/2002 | Walters | |
| 6,526,161 B1 | 2/2003 | Yan | |
| 6,847,393 B2 * | 1/2005 | Ashe et al. | 348/61 |
| 6,980,931 B1 | 12/2005 | Reitano | |
| 7,020,508 B2 | 3/2006 | Stivoric | |
| 7,778,855 B2 * | 8/2010 | Holliday | 705/7.31 |
| 7,999,857 B2 | 8/2011 | Bunn | |
| 8,010,402 B1 * | 8/2011 | Sharma et al. | 705/7.29 |
| 8,396,708 B2 | 3/2013 | Park | |
| 8,654,937 B2 | 2/2014 | Agapi | |
| 2002/0107741 A1 * | 8/2002 | Stern et al. | 705/16 |
| 2004/0001616 A1 * | 1/2004 | Gutta et al. | 382/118 |
| 2004/0176991 A1 * | 9/2004 | McKennan et al. | 705/10 |
| 2007/0011012 A1 | 1/2007 | Yurick | |
| 2008/0172261 A1 * | 7/2008 | Albertson et al. | 705/7 |
| 2008/0249856 A1 * | 10/2008 | Angell et al. | 705/14 |

(Continued)

FOREIGN PATENT DOCUMENTS

WO    WO 2006122057 A2 * 11/2006
WO    WO2010075522 A2    7/2010

OTHER PUBLICATIONS

Wu, Hao-Yu, et al. "Eulerian video magnification for revealing subtle changes in the world." ACM Trans. Graph. 31.4 (2012): 65.*

*Primary Examiner* — Jayesh A Patel
*Assistant Examiner* — Geoffrey E Summers
(74) *Attorney, Agent, or Firm* — Howard & Howard Attorneys PLLC

(57) ABSTRACT

Systems and methods are disclosed herein for improving customer service. A video feed of a camera viewing a POS queue is analyzed to identify customers and measure customer biometric data. The biometric data is analyzed and used to generate customer service actions such as alerting a representative or calling in additional staff if the data indicates customer dissatisfaction. The biometric data of a customer may be correlated to transaction data of the customer in order to detect changes of the purchase habits of the customer due to dissatisfaction. Changes in purchase habits, such as a loss of a customer, may be used in combination with the biometric data to establish thresholds of biometric data used to generate customer service actions.

14 Claims, 6 Drawing Sheets

(56) References Cited

U.S. PATENT DOCUMENTS

| | | | |
|---|---|---|---|
| 2008/0300951 A1* | 12/2008 | Kelly | 705/8 |
| 2009/0249342 A1* | 10/2009 | Johnson | 718/101 |
| 2009/0299814 A1* | 12/2009 | Grigsby et al. | 705/10 |
| 2010/0046806 A1 | 2/2010 | Baughman | |
| 2010/0086204 A1 | 4/2010 | Lessing | |
| 2011/0124977 A1 | 5/2011 | Winarski | |
| 2011/0196716 A1* | 8/2011 | Srinivasan et al. | 705/7.29 |
| 2011/0199486 A1* | 8/2011 | Moriya | 348/150 |
| 2011/0282662 A1* | 11/2011 | Aonuma et al. | 704/231 |
| 2013/0030875 A1* | 1/2013 | Lee et al. | 705/7.38 |
| 2013/0039483 A1* | 2/2013 | Wolfeld et al. | 379/265.03 |
| 2014/0019199 A1 | 1/2014 | Appel | |
| 2014/0063236 A1* | 3/2014 | Shreve et al. | 348/143 |

\* cited by examiner

DETECTING CUSTOMER DISSATISFACTION USING BIOMETRIC DATA

BACKGROUND

1. Field of the Invention

This invention relates to systems and methods for improving customer service.

2. Background of the Invention

It is much easier for a merchant to retain an existing customer than to acquire a new customer through advertising. However, it can also be very expensive to maintain sufficient staff to provide great customer service. It can also be difficult to establish an appropriate staffing level that will provide proper customer service without excess staffing. Often, if customer service is inadequate, this fact will not appear in data available to management until many customers have been lost. With so much competition, a customer will often simply go elsewhere rather than take the time to make a complaint.

The systems and methods disclosed herein provide an improved approach for characterizing customer dissatisfaction and adjusting staffing levels appropriately.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
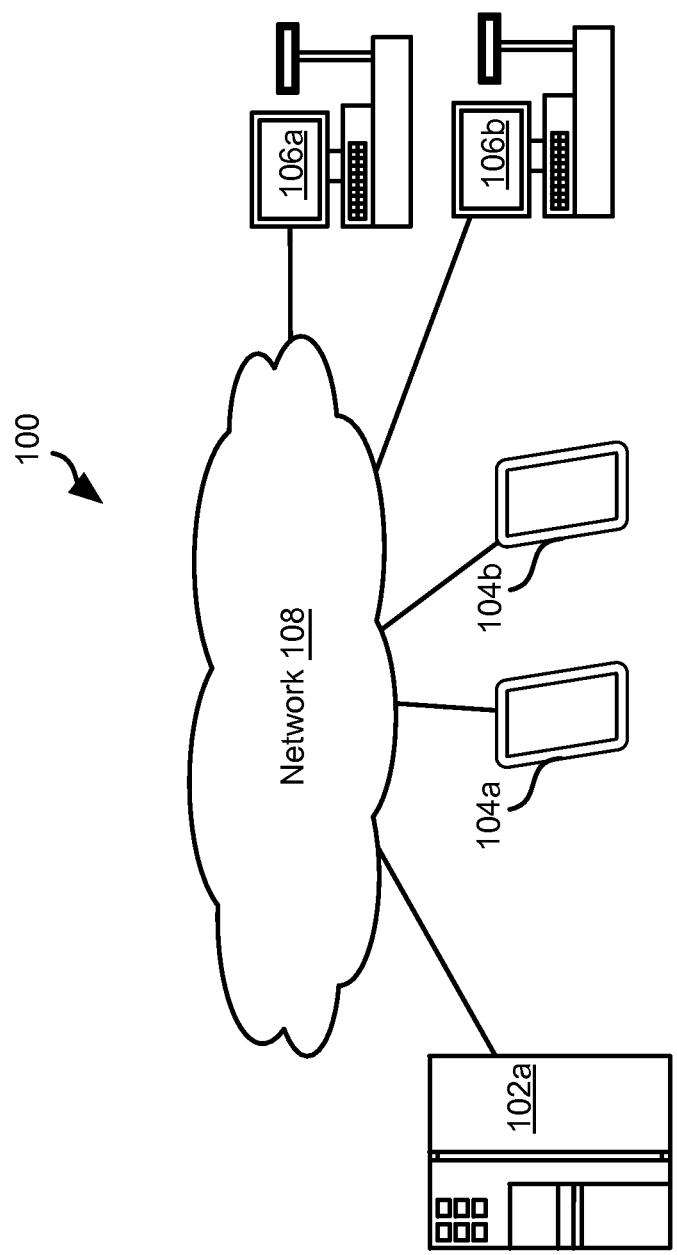
FIG. 1 is a schematic block diagram of a system for methods in accordance with embodiments of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Embodiments can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The present application discloses systems and methods for improving customer satisfaction. A computer system receives a video feed from a camera viewing a point of sale (POS) queue of a store. Individuals are identified in the video feed and the biometric data of the identified individuals is detected using the video feed. The dissatisfaction of the identified individuals may be characterized based on the biometric data. In some embodiments, a customer service action may be generated in accordance with the characterization of customer dissatisfaction.

A customer service action may include an alert transmitted to a representative of a merchant. A customer service action may additionally or alternatively include a message transmitted for display to an on-call employee, the message instructing the on-call employee to come to the store.

In some embodiments, biometric data of individuals is associated with transaction data, such as by identifying the time an individual is detected adjacent a POS and a time associated with a transaction conducted at the POS. The transaction data may be associated with the user through an account of the user, such as an account for providing access to electronic receipts.

Transaction data and biometric data associated with a customer may be used to identify changes in customer behavior that may be associated with dissatisfying experiences. In particular, where transaction data indicates a customer has stopped shopping at store, the level of dissatisfaction of the customer from previous experiences may be used to establish a threshold of biometric data used to decide when to take customer service action.

FIG. 1 illustrates a system 100 in which methods described hereinbelow may be implemented. The system 100 may include one or more server system 102a, 102b that may each be embodied as one or more server computers each including one or more processors that are in data communication with one another. The server systems 102a, 102b may be in data communication with one or more user computing devices 104a, 104b and one or more point of sale (POS) devices 106a, 106b. In the methods disclosed herein, the user computing devices 104a, 104b are advantageously mobile devices such as a mobile phone or tablet computer. As known in the art, many mobile phones and tablet computers also include cameras that can be used to scan optical codes such as barcodes, quick response (QR) codes, or textual information. The user computing devices 104a, 104b may be used by customers to access electronic receipt data.

In some embodiments, some or all of the methods disclosed herein may be performed using a desktop computer or any other computing device as the user computer 104a, 104b. For purposes of this disclosure, discussion of communication with a user or entity or activity performed by the user or entity may be interpreted as communication with a computer 104a, 104b associated with the user or entity or activity taking place on a computer associated with the user or entity. A POS 106a-106b may be located within a store and may be part of a POS network. In some embodiments, a POS 106a, 106b may be operable to process online transactions. In some embodiments, separate computers of the server system 102a, 102b may handle communication with the user computers 104a, 104b and POS 106a, 106b.

Some or all of the server systems 102a, 102b, user devices 104a, 104b, and POS 106 may communicate with one another by means of a network 108. The network 108 may be embodied as a peer-to-peer wireless connection between devices, a connection through a local area network (LAN), WiFi network, the Internet, or any other communication medium or system.

The server system 102a may be associated with a merchant, or other entity, providing one or both of electronic receipt archiving and customer dissatisfaction monitoring services. Alternatively, a separate server system 102b may provide customer dissatisfaction monitoring services and may be owned or controlled by the same or a different entity than the merchant server system 102a.

Figure 2:
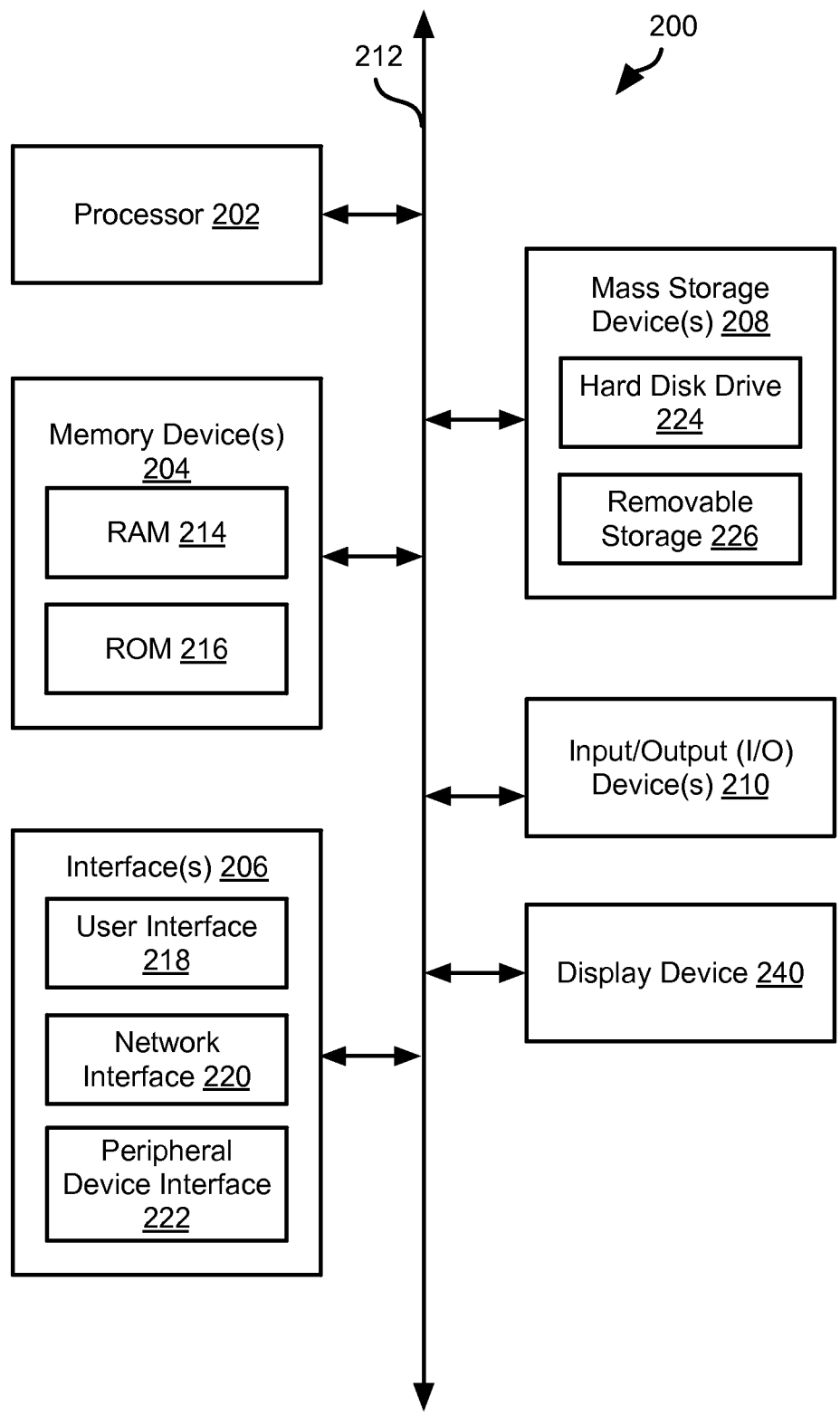
FIG. 2 is a block diagram of a computing device suitable for implementing embodiments of the present invention.

FIG. 2 is a block diagram illustrating an example computing device 200. Computing device 200 may be used to perform various procedures, such as those discussed herein. A server system 102a, 102b, user computer 104a, 104b, and POS 106a, 106b may have some or all of the attributes of the computing device 200. Computing device 200 can function as a server, a client, or any other computing entity. Computing device can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
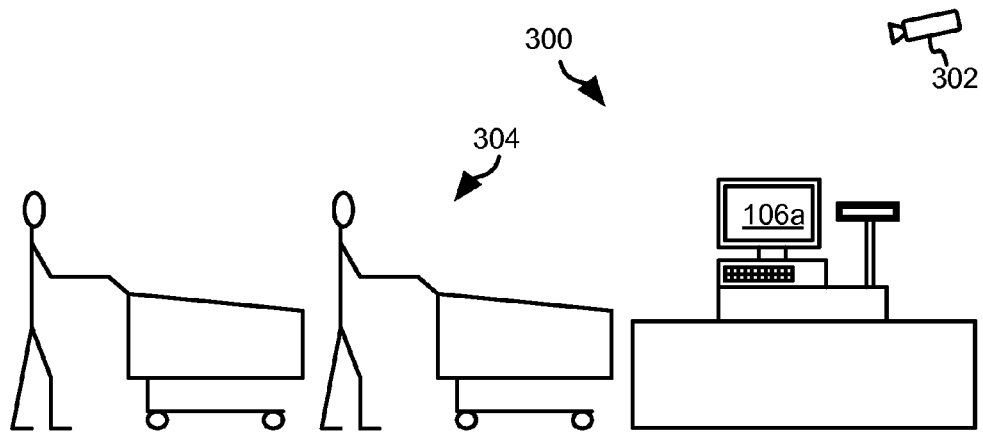
FIG. 3 is a schematic diagram of a point of sale queue suitable for implementing methods in accordance with embodiments of the present invention.

FIG. 3 illustrates a queue system 300 such as may be present at any store. The system 300 may include a POS 106a and a camera 302 positioned and oriented to view a customer queue 304. The camera 302 may preferably provide a video output of sufficient resolution to enable both distinguishing individuals in the customer queue 304 and detecting biometric data in the video output.

Figure 4:
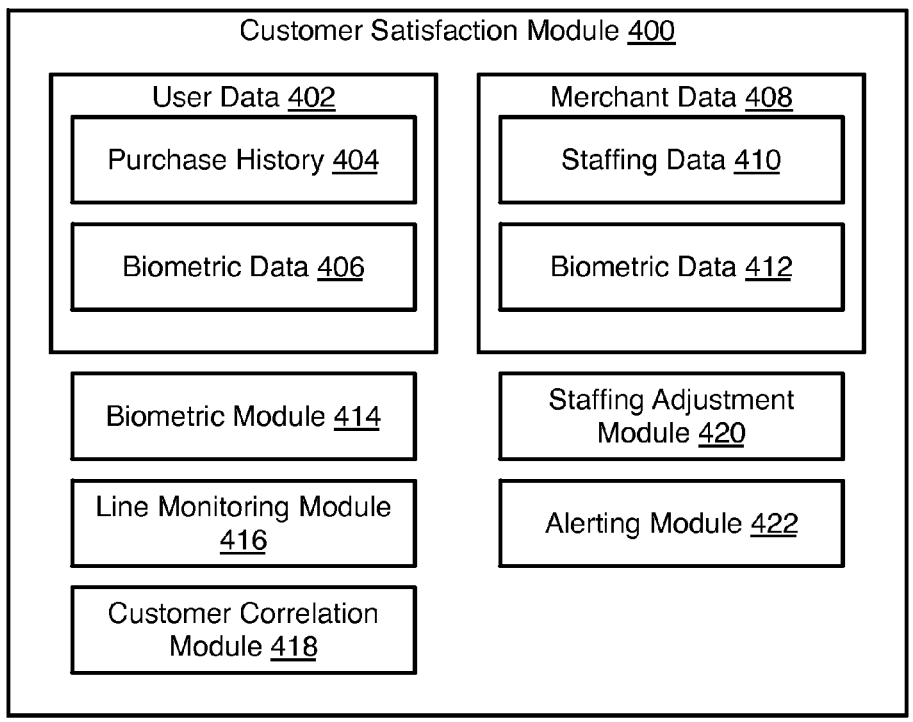
FIG. 4 is a schematic block diagram of a customer satisfaction module in accordance with an embodiment of the present invention.

FIG. 4 illustrates a customer satisfaction module 400 that may be used to implement methods using video data from a camera 302 and transaction data from a POS 106a. Some or all of the functions of the customer satisfaction module 400 may be implemented by the server system 102a, the POS 106a, or some other computing device.

The customer satisfaction module 400 may store or access user data 402, that may include for one or more users a purchase history 404 of the user and biometric data 406 for the user. A purchase history 404 of a user may include details of transactions conducted by the user at a POS 106a. The transaction data may include such information as the items purchased, the amount paid, the type of payment used, the account from which payment was made, the location of the purchase, an identifier or location of the POS 106a at which a transaction was concluded or the like.

Biometric data 406 for a user may include raw biometric data measured at a queue system 300 or some characterization or summary of this biometric data. For example, biometric data may be analyzed to estimate a level of agitation or annoyance. Biometric data that may be gathered from video data may include a heart rate, blood pressure, or the like. Methods and systems for extracting biometric data from video are known in the art and will not be described here.

Merchant data 408 may include may include staffing data that may be used in accordance to methods described herein. Staffing data may include shift data such as employees that would be available to staff a POS 106a, 106b or otherwise assist a customer at a given time of day. Staffing data may include one or both an identifier of on-call employees for a given shift and contact information for the on-call employees.

The merchant data 408 may also include biometric data 412. The biometric data 412 may include raw biometric data measured at a queue system 300, summaries of this data, or values derived from this data. For example, a trend of biometric data or data derived from biometric data at a given POS 106a, during working ours of a given cashier, for a particular store or region, may be stored as part of the biometric data 412.

The customer satisfaction module 400 may include a biometric module 414 implementing logic for extracting biometric data from video data. As noted above, methods for extracting such data from video of an individual are known in the art. The customer satisfaction module 400 may include a line monitoring module 416. The line monitoring module 416 may identify individuals in a video feed. In particular, the line monitoring module 416 may identify individuals as they enter the queue and track movements of each individual as they advance down the queue. In this manner, biometric data trends throughout the duration of an individual's time in a queue can be analyzed in accordance to methods described herein.

A customer correlation module 418 of the customer satisfaction module 400 may correlate the biometric data identified for an individual with a specific customer identifier or customer account. For example, the time range during which an individual is positioned adjacent the POS 106a may be noted for an individual. A transaction occurring in that time range at that POS 106a may then be identified. Where the identity of the customer for that transaction is known, the biometric data measured for the individual may accordingly be associated with that customer. For example, a merchant may provide a service that maintains electronic receipts for a customer that may be accessed by the customer or merchant for various purposes. In such circumstances, a customer may supply identification enabling the transaction to be associated with the customer's electronic receipt account. Accordingly, the transaction and the customer identifier are known and the time of the transaction may be used to associate measured biometric data for the customer with the customer identifier.

A staffing adjustment module 420 of the customer satisfaction module 400 may be operable to automatically make adjustments to staffing in response to detected dissatisfaction of customers in queues according to the biometric data. For example, the staffing adjustment module 420 may automatically transmit messages for display or playback to employees when dissatisfaction is found to exceed a threshold. A message may, for example, be sent to an employee occupied elsewhere in the store to go operate a POS register. A message may also be sent to an on-call employee where customer dissatisfaction indicates that help at the POS registers of a store is needed. In a like manner, an alerting module 422 may transmit alerting messages for display or playback to an employee, such as a customer service representatives to provide assistance to a customer that is detected to be dissatisfied using methods disclosed herein.

Figure 5:
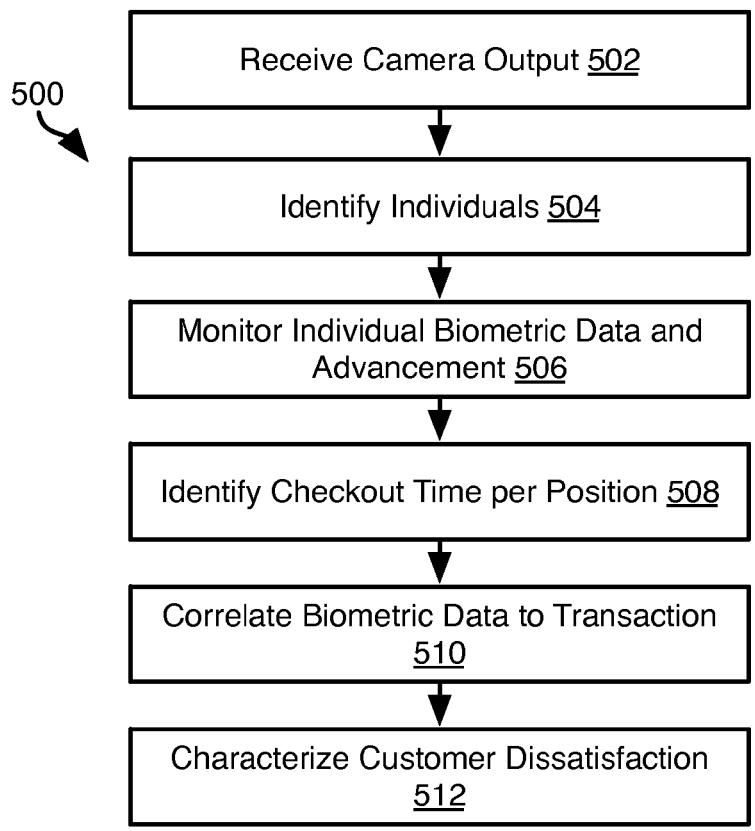
FIG. 5 is a process flow diagram of a method for characterizing customer dissatisfaction in accordance with an embodiment of the present invention.

FIG. 5 illustrates a method 500 for measuring customer dissatisfaction. The method 500 may be executed by the customer satisfaction module 400. The method 500 may include receiving 502 the output of a camera 302 from a queue system 300. The output may then be analyzed to identify 504 in the frames thereof images of individuals and, once an individual has been identified in a frame, identifying movement of that individual within the field of view of the camera throughout the video data. The biometric data of individuals identified may then be monitored 506 during that individual's appearance in the video data. For example, once an individual has been identified in the field of view of the camera, the biometric data of that individual may be measured periodically to establish a trend for that individual during their time in the queue.

A checkout time or window of time in which checkout may have occurred for an individual in the queue may be identified 508 and a customer identifier for the individual may be correlated to the biometric data measured for the individual. Correlation 510 may including comparing the time, or time range, identified for checkout to the time of transactions transacted at the same POS where the video data was captured. The transaction with the time in the time range and the customer associated with the transaction may then be associated with the biometric data. The biometric data for the customer may also be analyzed to characterize 512 the dissatisfaction of the customer.

Figure 6:
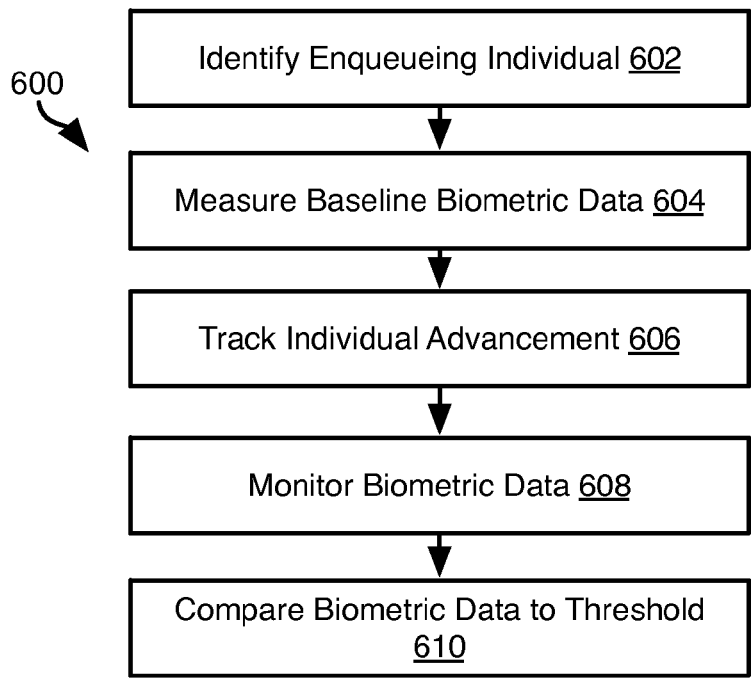
FIG. 6 is a process flow diagram of a method for monitoring biometric data of an individual in accordance with an embodiment of the present invention.

FIG. 6 illustrates a method 600 for estimating whether a customer is dissatisfied during the customer's time in a queue. The method 600 may be executed by the customer satisfaction module 400. The method 600 may include identifying 602 an enqueueing individual. For example, as an individual moves into the field of view of the camera the individual may be identified as a new entity to be tracked within the field of view of the camera as the individual advances along the queue. As soon as a sufficient portion of an individual has entered into the field of view of the camera or as soon as the individual is identified as entering the queue, baseline biometric data may be measured 604. The individual may then be tracked 606 in the field of view of the camera and the individual's biometric data may be monitored 608. The biometric data as monitored may be compared 610 to the baseline measurement. Where the biometric data meets one or more conditions such as being a given amount above the baseline measurement, a given percentage above the baseline measurement, or above an absolute value, the customer may be deemed to be dissatisfied for purposes of the methods disclosed herein. Deeming a customer to be dissatisfied may be represented as a flag or Boolean value indicating annoyance or a value measuring the degree of dissatisfaction such as the amount by which the customer's biometric data exceeds the threshold.

Figure 7:
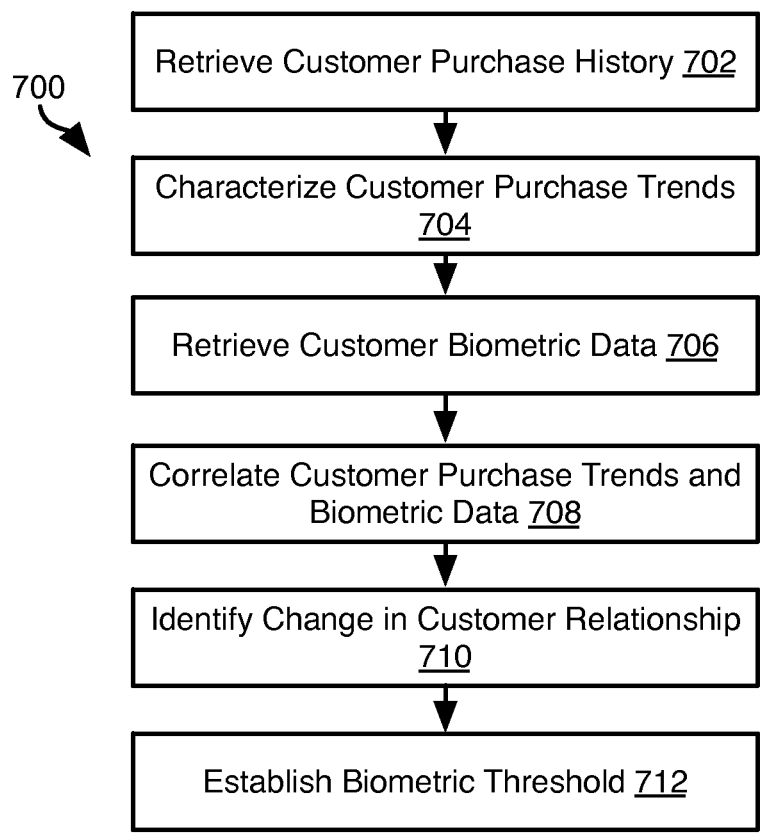
FIG. 7 is a process flow diagram of a method for establishing a biometric threshold in accordance with an embodiment of the present invention.

FIG. 7 illustrates a method 700 for establishing a threshold for biometric data above which intervention should be made. The method 700 may be executed by the customer satisfaction module 400.

The method 700 may include retrieving 702 a customer's purchase history and characterizing 704 customer purchase trends. For example, data points representing the amount spent per week by the customer over time may be calculated or retrieved based on the transactions of a customer's purchase history. Significant drops, or complete absence, of customer spending in this data may also be identified. Particularly, any points in time at which a customer ceases to conduct transactions or significantly curtails the number of transactions or amount of transactions may be identified.

The biometric data for a customer may also be retrieved 706. The biometric data may be raw data or biometric data processed to reflect a measure of customer dissatisfaction as described with respect to the method 600 FIG. 6. The customer purchase trends may then be correlated 708 with the biometric data. This correlation may be a temporal correlation whereby purchases over time are matched to biometric data over time. Using this correlation changes in the customer relationship may be identified 710. For example, where a complete cessation of transactions, a significant drop in the number of transactions, or a significant drop in the value of transactions occur in the purchase history, a preceding event of dissatisfaction reflected in the biometric data may be identified. In particular, the degree of dissatisfaction that preceded the negative change in purchasing activity may be noted.

Using this information a biometric threshold may be established 712. For example, for negative changes identified among a pool of current or past customers, the degree of dissatisfaction measured for these customers preceding the negative change may be evaluated. A characteristic value, such as an average, of the preceding dissatisfaction metrics may be calculated. A threshold may be calculated using this characteristic value, such as by calculating some threshold value that is some fraction of the characteristic value. For example, a threshold may be chosen that is less than 80% of the characteristic value, or some other percentage.

Figure 8:
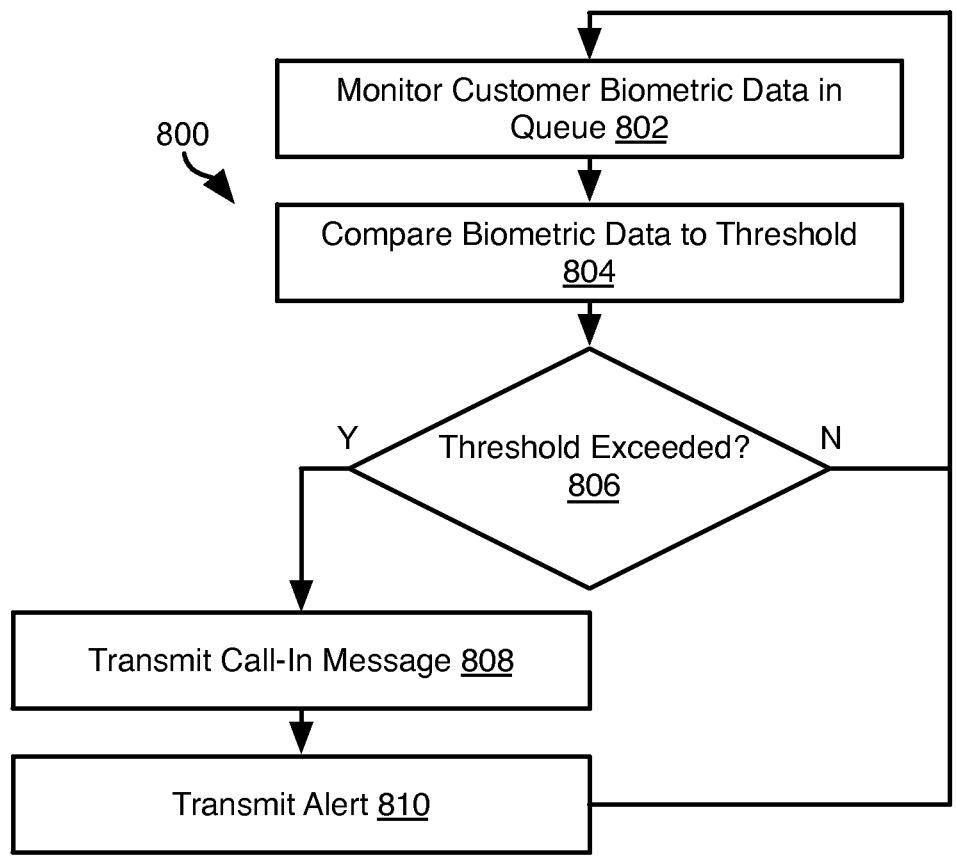
FIG. 8 is a process flow diagram of a method for improving customer service based on biometric data in accordance with an embodiment of the present invention.

FIG. 8 illustrates a method 800 for taking customer service actions in accordance with measurements of customer dissatisfaction. The method 800 may be executed by the customer satisfaction module 400.

The method 800 may include monitoring 802 customer biometric data measured in a queue 802 and comparing the monitored biometric data to a threshold 804. The biometric data may be processed as described above, such as measuring increases in customer biometric values in comparison to baseline measurements taken for each customer. Where the biometric data, or a value computed based thereon, such as a difference from a baseline value, is found 806 to exceed the threshold according to the comparison, one or more customer service actions may be taken. In some embodiments, a threshold may be found 806 to be exceeded if the customer dissatisfaction of a single customer in a queue exceeds a threshold. Alternatively, action may be triggered only if a predetermined number N of customers are found to have dissatisfaction metrics above the threshold. In yet another embodiment, action may be triggered if an average dissatisfaction metric for the customer's in queue is found to exceed a threshold.

In some embodiments, a message may be transmitted 808 for display to a call-in employee to come in and operate a POS in order to reduce queue wait times. A customer service action may include transmitting 810 an alert for display to an employee or customer service representative. The alert may include sufficient information to permit the recipient to locate the problem and take meliorating action. For example, the alert may identify the POS where excess dissatisfaction was detected or an image of the customer who was found to have excess dissatisfaction.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A method for improving customer service, the method comprising:
   receiving, by a computer system, a video feed from a camera viewing a point of sale (POS) queue of a store;
   identifying, by the computer system, individuals in the video feed;
   detecting, by the computer system, biometric data of the identified individuals using the video feed;
   identifying, by the computer system, times at which the identified individuals are positioned adjacent the POS;
   correlating, by the computer system, transactions of the identified individuals with the detected biometric data of the identified individuals using the identified times;
   identifying a loss of a customer according to the correlation of transactions of the identified individuals and detected biometric data;
   establishing a threshold defined by the steps of:
      characterizing customer purchase trends from customer purchase history,
      correlating the customer purchase trends with the detected biometric data,
      utilizing the correlation to identify changes in a customer relationship with the store;
      calculating a characteristic value of the changes in the customer relationship with the store, and
      establishing the threshold by taking a percentage of the calculated characteristic value;
   characterizing, by the computer system, customer dissatisfaction from the detected biometric data; and
   generating, by the computer system, a customer service action when the characterization of the customer dissatisfaction exceeds the threshold.

2. The method of claim 1, wherein the customer service action is an alert transmitted to a device of a merchant representative.

3. The method of claim 1, wherein the customer service action is a message transmitted for display to an on-call employee, the message instructing the on-call employee to come to the store.

4. The method of claim 1, wherein generating, by the computer system, the customer service action in accordance with the characterization of the customer dissatisfaction further comprises:
   comparing the detected biometric data of at least one of the identified individuals to the threshold; and
   generating the customer service action in accordance with the comparison.

5. The method of claim 1, further comprising generating the customer service action in accordance with the comparison if a predetermined number of the identified individuals in the queue have detected biometric data above the threshold.

6. The method of claim 1, wherein detecting, by the computer system, biometric data of the identified individuals using the video feed further comprises:
   identifying each of the identified individuals upon enqueuing;
   tracking each of the identified individuals as the identified individuals advance in the POS queue; and
   periodically measuring the biometric data of each of the identified individuals.

7. The method of claim 6, further comprising comparing biometric data of the identified individuals detected upon enqueuing to biometric data periodically measured for the identified individuals.

8. A system for improving customer service, the system comprising one or more processors and one or more memory devices operably coupled to the one or more processors, the one or more memory devices storing executable and operational code effective to cause the one or more processors to:
   receive a video feed from a camera viewing a point of sale (POS) queue of a store;
   identify individuals in the video feed;
   detect biometric data of the identified individuals using the video feed;
   identify times at which the identified individuals are positioned adjacent the POS;
   correlate transactions of the identified individuals with the detected biometric data of the identified individuals using the identified times;
   identify a loss of a customer according to the correlation of transactions of the identified individuals and detected biometric data;
   establish a threshold, wherein the executable and operational code effective to cause the one or more processors to establish the threshold are further effective to cause the one or more processors to:
      characterize customer purchase trends from customer purchase history,
      correlate the customer purchase trends with the detected biometric data,
      utilize the correlation to identify changes in a customer relationship with the store,
      calculate a characteristic value of the changes in the customer relationship with the store, and
      establish the threshold by taking a percentage of the calculated characteristic value;
   characterize customer dissatisfaction from the detected biometric data; and
   generate a customer service action when the characterization of the customer dissatisfaction exceeds the threshold.

9. The system of claim 8, wherein the customer service action is an alert transmitted to a device of a merchant representative.

10. The system of claim 8, wherein the customer service action is a message transmitted for display to an on-call employee, the message instructing the on-call employee to come to the store.

11. The system of claim 8, wherein the executable and operational code are further effective to cause the one or more processors to generate the customer service action in accordance with the characterization of the customer dissatisfaction by:
   comparing the detected biometric data of at least one of the identified individuals to the threshold; and
   generating the customer service action in accordance with the comparison.

12. The system of claim 8, wherein the executable and operational code are further effective to cause the one or more processors to generate the customer service action in accordance with the comparison if a predetermined number of the identified individuals in the queue have detected biometric data above the threshold.

13. The system of claim 8, wherein the executable and operational code are further effective to cause the one or more processors to detect biometric data of the identified individuals using the video feed by:

identifying each of the identified individuals upon enqueuing;
tracking each of the identified individuals as the identified individuals advance in the POS queue; and
periodically measuring the biometric data of each of the identified individuals.

14. The system of claim 13, wherein the executable and operational code are further effective to cause the one or more processors to compare biometric data of the identified individuals detected upon enqueuing to biometric data periodically measured for the identified individuals.

\* \* \* \* \*